(12) United States Patent
Gilbert et al.

(10) Patent No.: US 7,827,449 B2
(45) Date of Patent: Nov. 2, 2010

(54) NON-INLINE TRANSACTION ERROR CORRECTION

(75) Inventors: Bruce M. Gilbert, Beaverton, OR (US); Donald R. DeSota, Portland, OR (US); Robert Joersz, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 12/020,562

(22) Filed: Jan. 27, 2008

(65) Prior Publication Data

US 2008/0141078 A1 Jun. 12, 2008

Related U.S. Application Data

(63) Continuation of application No. 10/730,815, filed on Dec. 8, 2003, now Pat. No. 7,383,464.

(51) Int. Cl.
*G06F 11/00* (2006.01)
*G06F 11/10* (2006.01)
(52) U.S. Cl. .............................. 714/49; 714/10; 714/52
(58) Field of Classification Search .................. 714/10, 714/49, 52
See application file for complete search history.

(56) References Cited

U.S. PATENT DOCUMENTS

| | | | | |
|---|---|---|---|---|
| 4,604,750 | A | * | 8/1986 | Manton et al. ............... 714/764 |
| 5,283,891 | A | * | 2/1994 | Suzuki et al. ................. 714/45 |
| 6,543,028 | B1 | * | 4/2003 | Jamil et al. .................. 714/800 |
| 6,629,271 | B1 | * | 9/2003 | Lee et al. ....................... 714/49 |
| 6,785,842 | B2 | * | 8/2004 | Zumkehr et al. .............. 714/17 |
| 6,792,560 | B2 | * | 9/2004 | Francis et al. ................. 714/30 |
| 6,996,665 | B2 | * | 2/2006 | DeSota et al. ............... 711/109 |
| 2003/0079151 | A1 | * | 4/2003 | Bohrer et al. ............... 713/320 |

* cited by examiner

*Primary Examiner*—Scott T Baderman
*Assistant Examiner*—Joseph Schell
(74) *Attorney, Agent, or Firm*—Steven Lieske Bennett (57) ABSTRACT

Non-inline transaction error correction is disclosed. Where a transaction being processed in a pipeline is determined to include a correctable error, it is output, or drained, from the pipeline into an error queue. The pipeline is switched from a normal mode of operation to a correction mode of operation. In the correction mode, a correction command is inserted into and processed within the pipeline to correct the error within the transaction. The pipeline is switched from the correction mode of operation to a restart mode of operation. In the restart mode, the transaction is reprocessed within the pipeline. The pipeline is then switched from the restart mode of operation back to the normal mode of operation.

10 Claims, 5 Drawing Sheets

NON-INLINE TRANSACTION ERROR CORRECTION

RELATED PATENT APPLICATIONS

The present patent application is a continuation of the presently pending patent application also entitled "non-inline transaction error correction," filed on Dec. 8, 2003, and assigned application Ser. No. 10/730,815.

BACKGROUND OF THE INVENTION

1. Technical Field

This invention relates generally to processing transactions within a pipeline, and more particularly to correcting errors within such transactions.

2. Description of the Prior Art

Pipelining is a technique that is used to speed up the processing of transactions. Transactions include read commands, which read data from memory, and write commands, which write data to memory. Typically, only one transaction can be processed at a time. Inserting register points within transaction-processing logic is referred to as pipelining. The logic between two sets of register points is referred to as a pipeline stage. Pipelining allows a different transaction to be within each stage of the pipeline, thus increasing processing throughput. Pipelining also allows the frequency of the processor to be increased, because the levels of processing logic between register points are reduced. However, the overall time to process a transaction may be increased only slightly, due to the delay of the registers that are inserted in the logic. Pipelining also can increase complexity if there are dependencies between transactions.

If errors are detected within the pipeline, they usually are corrected in-line, within the pipeline stage where they occur, before the transactions can be properly processed and the resulting actions performed. An implementation for error correction may include additional hardware circuitry to correct the error when and where it is detected. However, such an implementation adds latency to the processing of both transactions with errors and transactions without errors. For this and other reasons, therefore, there is a need for the present invention.

SUMMARY OF THE INVENTION

The invention relates to non-inline transaction error correction. A method for the invention determines whether a transaction includes a correctable error while the transaction is being processed in a pipeline. Where the transaction includes an error, it is output from the pipeline into an error queue. A correction command is processed within the pipeline to correct the error within the transaction, and then the transaction is reprocessed within the pipeline.

A system of the invention includes a number of nodes interconnected to one another. Each node includes processors, local random-access memory (RAM) for the processors, and at least one controller. The controllers process transactions relating to the local RAM of the node, including correcting correctable errors within the transactions in a non-inline manner in a separate correction mode.

A controller for a node of a system includes a pipeline, a mode controller, and an error queue. Transactions are processed in the pipeline. The mode controller controls the mode in which the pipeline is operable. Examples are modes in which the pipeline is operable include normal mode, correction mode, and restart mode. Those of the transactions including correctable errors are routed to the error queue for correction of the errors, and reprocessing of the transactions.

Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
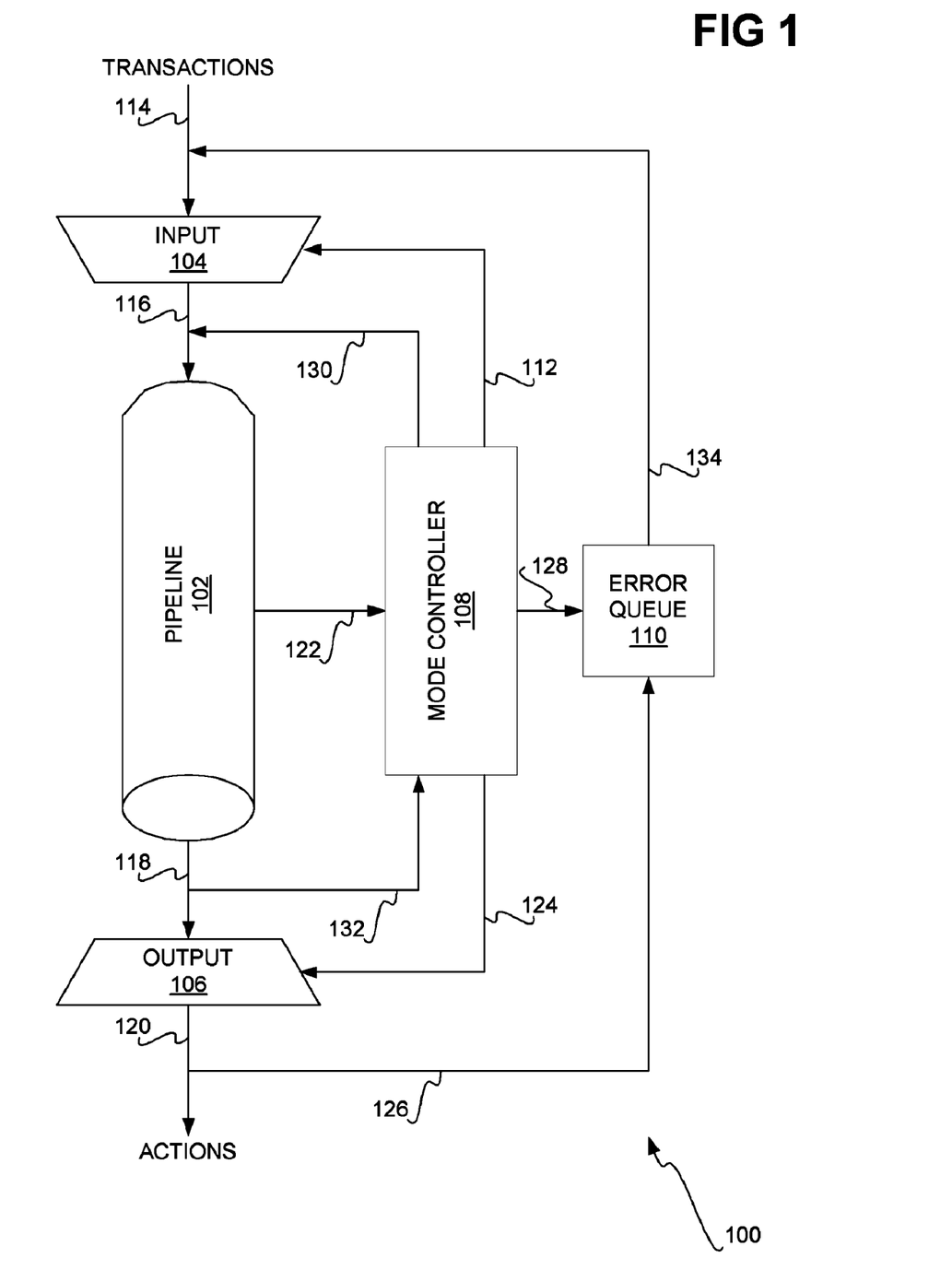
FIG. 1 is a diagram illustrating a pipeline, according to an embodiment of the invention, and is suggested for printing on the first page of the patent.

FIG. 1 shows a portion of a controller 100 for a node, according to a preferred embodiment of the invention. The node may be part of a multiple-node system that includes other nodes and in which all the nodes are communicatively coupled to one another via an interconnect. The controller 100 may be an integrated circuit (IC), such as an application-specific IC (ASIC). The controller 100 includes a pipeline 102, which has an input 104 and an output 106. The controller 100 also includes a mode controller 108, and an error queue 110. As can be appreciated by those of ordinary skill within the art, the controller 100 may also include components other than those depicted in FIG. 1.

The controller 100 normally operates as follows. The mode controller 108 switches, or operates, the pipeline 102 in a normal mode of operation, by selecting the input 104 appropriately, as indicated by the arrow 112. In the normal mode of operation, transactions are processed within the pipeline 102, where none of the transactions have been detected as including errors. Transactions are input into the input 104 of the pipeline 102, as indicated by the arrow 114. The transactions are transferred from the input 104 into the pipeline 102, as indicated by the arrow 116. The pipeline 102 may be a single- or multiple-stage pipeline, and processes the transactions such that they are converted into actions that when performed effect the transactions. Thus, the pipeline 102 outputs the processed transactions into the output 106, as indicated by the arrow 118, from which they are output, as indicated by the arrow 120, as actions that can then be performed.

When transactions do not contain correctable errors, the pipeline 102 processes them normally, in a normal mode of operation, without adding latency that may otherwise result from in-line error correction processing that would have to be performed even on error-free transactions. When transactions contain errors, however, they are drained and corrected in a separate correction mode, and reprocessed in a separate restart mode, and a non-inline manner. Such transactions are drained into the error queue 110, and the mode controller 108 first switches the pipeline 102 to the correction mode to correct the errors, and then switches the pipeline 102 to the restart mode to reprocess the error-corrected transactions.

However, a transaction may include one or more correctable errors. In such instance, the errors are detected in the pipeline 102, and the pipeline 102 notifies the mode controller 108, as indicated by the arrow 122. The mode controller 108 controls the output 106, as indicated by the arrow 124, so that the transaction is output from the output 106 into the error queue 110, as indicated by the arrow 126. Any other transactions that are present in the pipeline 102 are likewise drained into the error queue 110, even those transactions not having any errors. When such errors are detected, and the transactions in the pipeline 102 are drained into the error queue 110, the pipeline 102 is said to be operating in a correction mode, as controlled by the mode controller 108.

The mode controller 108 thereafter controls the input 104, as indicated by the arrow 112, while the pipeline 102 operates in the correction mode. The mode controller 108 issues a correction command to correct the error, as indicated by the arrow 130. The pipeline 102 thus corrects the error per the correction command. When the pipeline 102 has corrected the error, confirmation of the error correction is sent to the mode controller 108, as indicated by the arrow 132. If the transaction contained more than one error, this process is performed repeatedly, until there are no more errors. That is, the pipeline 102 preferably can correct one error at a time. In other embodiments, all errors could be corrected with a single correction command.

Once the transaction has had its errors corrected, the mode controller 108 controls the error queue 110, as indicated by the arrow 128, to reinsert the transactions therein into the input 104 of the pipeline 102, as indicated by the arrow 134. The mode controller 108 controls the input 104, as indicated by the arrow 112, so that the pipeline 102 operates in a restart mode. In the restart mode, the transactions output by the error queue 110 are reprocessed in the pipeline 102, where the transactions have already had their errors corrected. Once all the transactions have been processed within the pipeline 102, and have been output from the output 106 as performable actions, as indicated by the arrow 120, the mode controller 108 controls the input 104, as indicated by the arrow 112, so that the pipeline 102 again operates in the normal mode. If a transaction cycles through the error queue multiple times an uncorrectable error may be signaled. If an uncorrectable error is signaled, it can be flushed from the pipeline 102, and not performed due to its having an uncorrectable error.

System and Detailed Node

Figure 2:
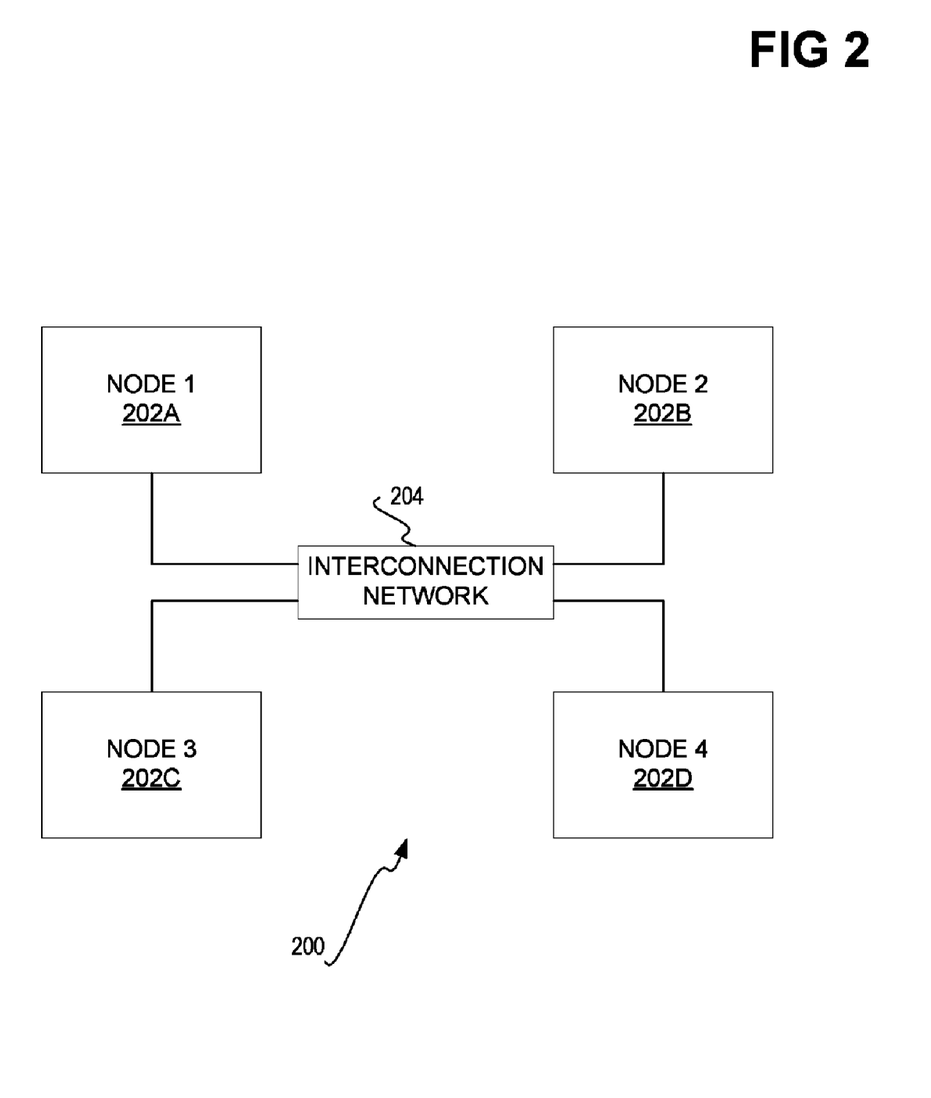
FIG. 2 is a diagram of a system having a number of multi-processor nodes, in conjunction with which embodiments of the invention may be implemented.

FIG. 2 shows a system 200 in accordance with which embodiments of the present invention may be implemented. The system 200 includes a number of multiple-processor nodes 202A, 202B, 202C, and 202D, which are collectively referred to as the nodes 202. Each of the nodes 202 may be implemented in part as the node 100 of FIG. 1 that has been described. The nodes 202 are connected with one another through an interconnection network 204, or interconnect. Each of the nodes 202 may include a number of processors and memory. The memory of a given node is local to the processors of the node, and is remote to the processors of the other nodes. Thus, the system 200 can implement a non-uniform memory architecture (NUMA) in one embodiment of the invention.

Figure 3:
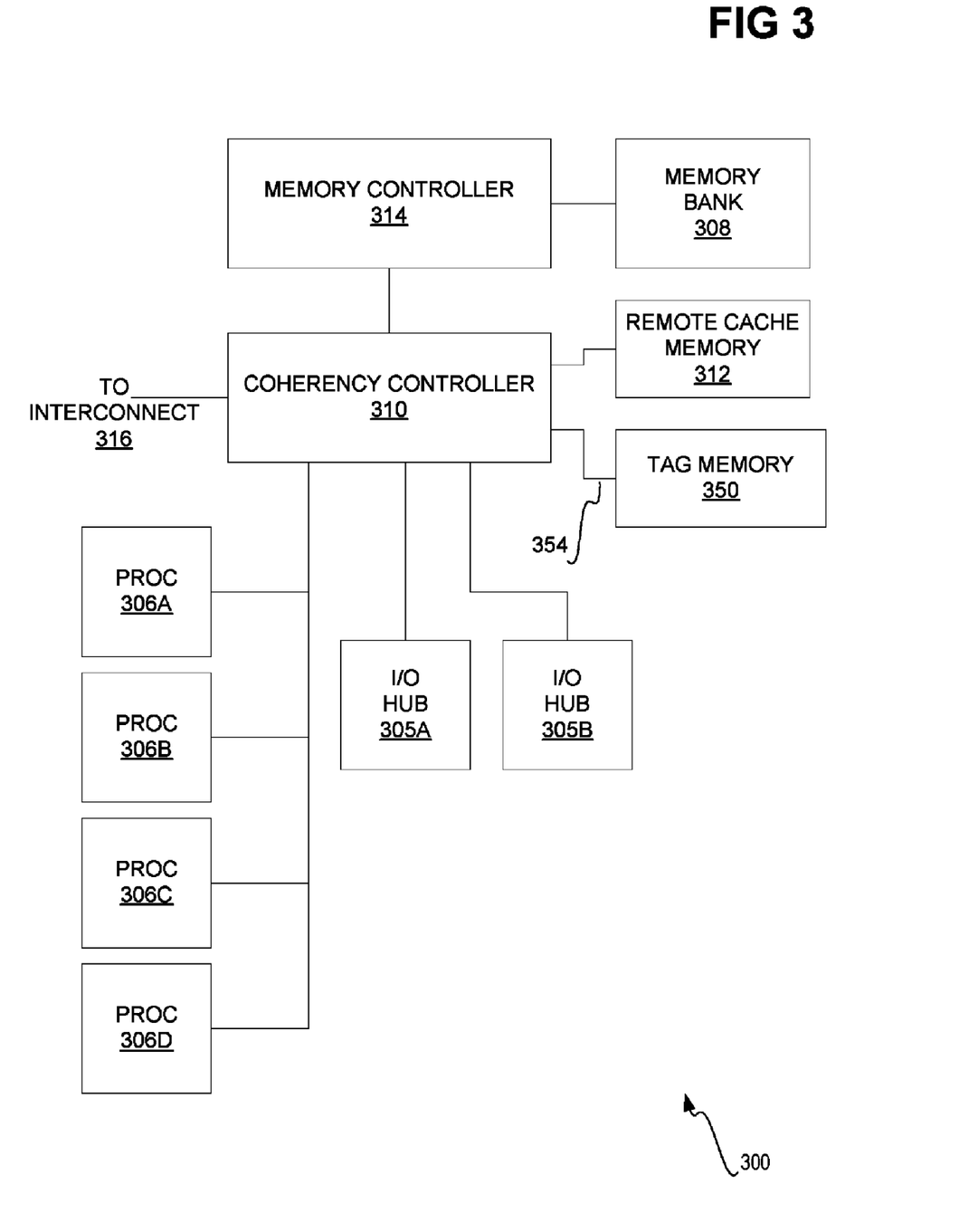
FIG. 3 is a diagram of one of the nodes of the system of FIG. 2 in more detail, according to an embodiment of the invention.

FIG. 3 shows in more detail a node 300, according to an embodiment of the invention, which can implement one or more of the nodes 202 of FIG. 2. As can be appreciated by those of ordinary skill within the art, only those components needed to implement one embodiment of the invention are shown in FIG. 3, and the node 300 may include other components as well. The node 300 has four processors 306A 306B, 306C, and 306D, collectively referred to as the processors 306. The node 300 also has two input-output (I/O) hubs 305A and 305B, used to attach peripheral controllers, and which are collectively referred to as the I/O hubs 305. The I/O hubs 305 may also generate requests for memory that must be processed by the coherency controller.

The node 300 includes a portion of system memory, referred to as the memory bank 308. The memory bank 308 represents an amount of random-access memory (RAM) local to the node. The node 300 may have more than a single bank of memory, however. The memory controller 314 manages requests to and responses from the memory bank 308. The coherency controller 310 maintains coherency for the memory bank 308. The coherency controller 310 may be an application-specific integrated circuit (ASIC) in one embodiment, as well as another combination of software and hardware. The coherency controller 310 also may have a remote cache memory 312 for managing requests and responses that relate to remote memory, which is the local memory of nodes other than the node 300 is a part. Stated another way, the memory bank 308 is local to the node 300, and is remote to nodes other than the node 300. The coherency controller 310 is preferably directly connected to the interconnection network that connects all the nodes, such as the interconnection network 204 of FIG. 2. This is indicated by the line 316, with respect to the coherency controller 310.

The coherency controller 310 interfaces with tag memory 350 via the tag busses 354. The tag memory 350 includes the directory maintaining coherency information regarding the lines of memory of the remote cache memory 312, and information relating to remote references to the memory lines of the memory bank 308. The remote caching information regarding the memory lines of the memory bank 308 may include whether any other nodes are also caching the memory lines of memory bank 308, and whether any of the other nodes have modified the memory lines of the memory bank 308. The tag memory 350, as well as the remote cache memory 312, may be external to the controller 310 or implemented in embedded dynamic random-access memory (DRAM) or embedded static random-access memory (SRAM).

Controller and Method

Figure 4:
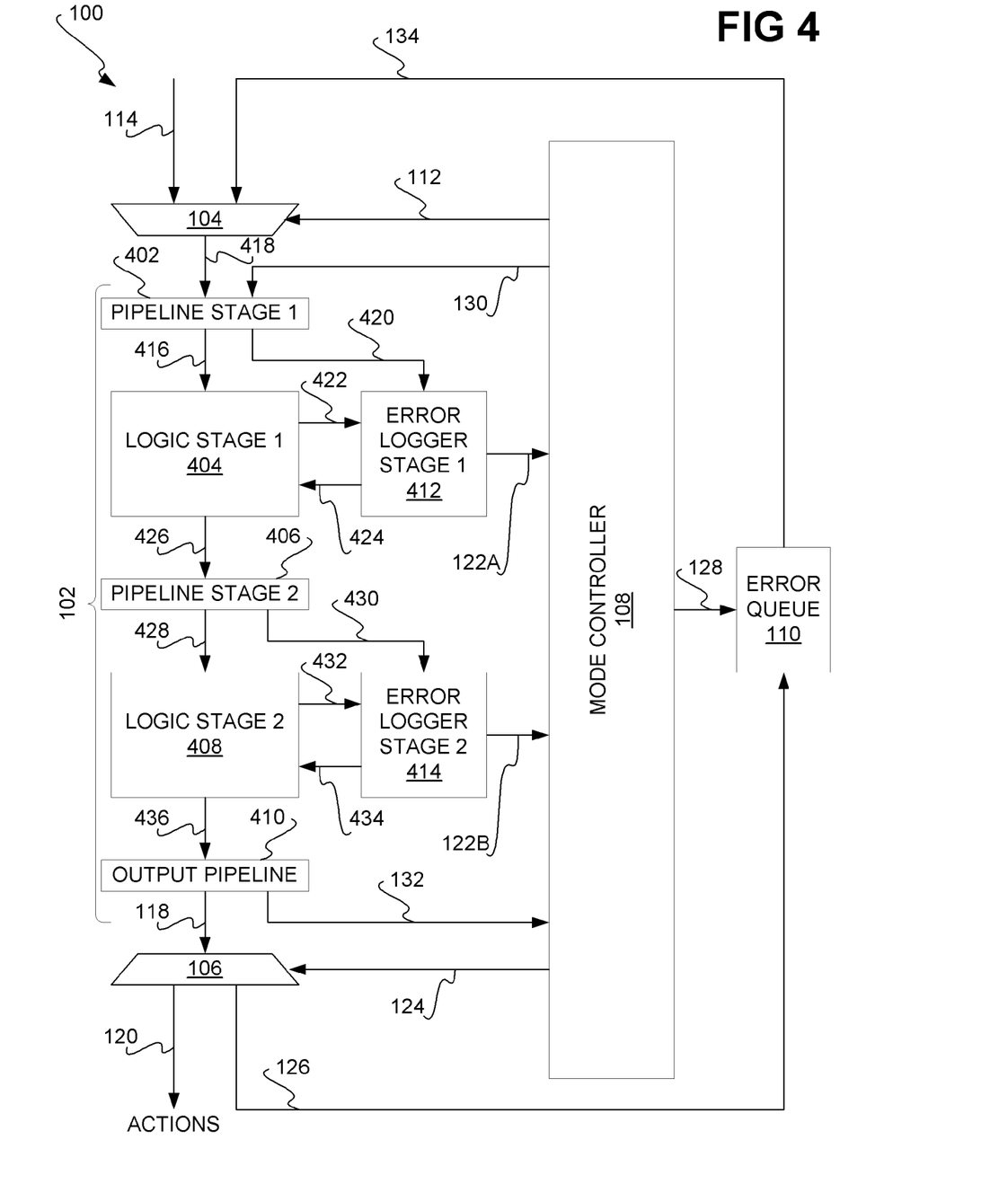
FIG. 4 is a diagram of a pipeline that is more detailed than but consistent with the pipeline of FIG. 1, according to an embodiment of the invention.

FIG. 4 shows the controller 100 in more detail than but consistent with the controller 100 of FIG. 1, according to an embodiment of the invention. Specifically, the pipeline 102 of the controller 100 is depicted in FIG. 4 as including two stages, a first pipeline stage 402 and a second pipeline stage 406. As can be appreciated by those of ordinary skill within the art, the pipeline 102 may have more than two stages. Furthermore, the pipeline 102 may instead be a single-stage pipeline, rather than a multiple-stage pipeline.

In a normal mode of operation, the pipeline 102 operates as follows. Transactions are input to the input 104, as indicated by the arrow 114, from which they are transferred to the first pipeline stage 402, as indicated by the arrow 418. The pipeline stage 402 inputs transactions to a first logic stage 404, as indicated by the arrow 416, and which are output therefrom, as indicated by the arrow 426. The first logic stage 404 performs a first stage of processing on the transactions. This processing may include the conversion of the transactions into performable actions that when performed effect the transactions.

The second pipeline stage 406 similarly inputs transactions to second logic stage 408, as indicated by the arrow 428, and which are output therefrom, as indicated by the arrow 436. The second logic stage 408 performs a second stage of processing on the transactions. The transactions then exit the pipeline from the pipeline output 410, to the output 106, as indicated by the arrow 118. Where the transactions do not include any correctable errors, they exit the output 106, as indicated by the arrow 120. The transactions move through the pipeline 102 preferably as synchronized by clock cycles. In each clock cycle, a new transaction enters the first pipeline stage 402, the transaction in the first pipeline stage 402 enters the second pipeline stage 406, and the transaction in the second pipeline stage 406 exits the pipeline.

As has been noted, a transaction may include one or more correctable errors. If in the normal mode of operation the logic stage 404 detects the error in the first pipeline stage 402, the first error logger stage 412 is notified, as indicated by the arrow 422. If in the normal mode of operation the logic stage 408 detects the error in the second pipeline stage 406, the second error logger stage 414 is notified, as indicated by the arrow 432. The error logger stages 412 and 414 are preferably part of the pipeline 102, but are not inline with the pipeline stages 402 and 406. Thus, where the transaction does not include any errors, the logger stages 412 and 414 are not involved in the processing of the transaction, avoiding an increase in latency in the processing of the transaction.

The logger stages 412 and 414, when notified by the logic stages 404 and 408 that a correctable error has been found, indicate the presence of the error to the mode controller 108, as indicated by the arrows 122A and 122B, respectively. The mode controller 108 in turn causes the pipeline 102 to switch to a correction mode of operation. The transactions already in the pipeline 102, including the transaction that includes the correctable error or errors, are drained from the pipeline 102 into the error queue 110, as indicated by the arrow 126. While draining the pipeline 102, the mode controller 108 causes the input 104 not to input any new transactions into the pipeline 102, by appropriately selecting the input 104 as indicated by the arrow 112. The mode controller 108 then inserts a correction command into the pipeline 102, as indicated by the arrow 130.

The correction command is processed through the pipeline 102 as if it were a transaction, and corrects the first, or only, correctable error that was detected. If the logic stage 404 had detected the error, the error logger stage 412 in the correction mode can provide information to properly correct the error, as indicated by the arrow 424, where the first pipeline stage 402 provides the correction command to the error logger stage 412, as indicated by the arrow 420. Conversely, if the logic stage 408 had detected the error, the error logger stage 414 in the correction mode can provide information to properly correct the error, as indicated by the arrow 434, where the second pipeline stage 406 provides the correction command to the error logger stage 414, as indicated by the arrow 430.

At the end of the processing of the correction command, the pipeline 102 outputs confirmation of the correction of the error, as indicated by the arrow 132. If there were more than one correctable error, the process that has been described is repeated for each additional error. It is noted that once a first correction command has exited the first pipeline stage 402, a second correction command may enter the first pipeline stage 402, so that, in a two-stage pipeline, up to two correction commands can be in the pipeline 102 at any given time, as can be appreciated by those of ordinary skill within the art.

Once the errors have been corrected, the mode controller 108 causes the pipeline 102 to switch to a restart mode of operation. The restart mode of operation is similar to the normal mode of operation, except that rather than causing the input 104 to accept new transactions in the pipeline 102, as indicated by the arrow 114, the mode controller 108 controls the input 104 to accept the transactions from the error queue 110, as indicated by the arrow 134. The error queue 110 may include a first in, first out (FIFO) queue. Thus, in the restart mode of operation, the transactions that had been drained to the error queue 110 reenter the pipeline 102 for normal processing. The transactions are now processed correctly, since any errors have been corrected. Once the error queue 110 is empty, such that all of its transactions have entered the pipeline 102, the mode controller 108 sets the mode of the pipeline 102 to normal mode and causes it to again process new transactions, by selecting the input 104, as indicated by the arrow 112, so that new transactions enter the input 104, as indicated by the arrow 114.

Figure 5:
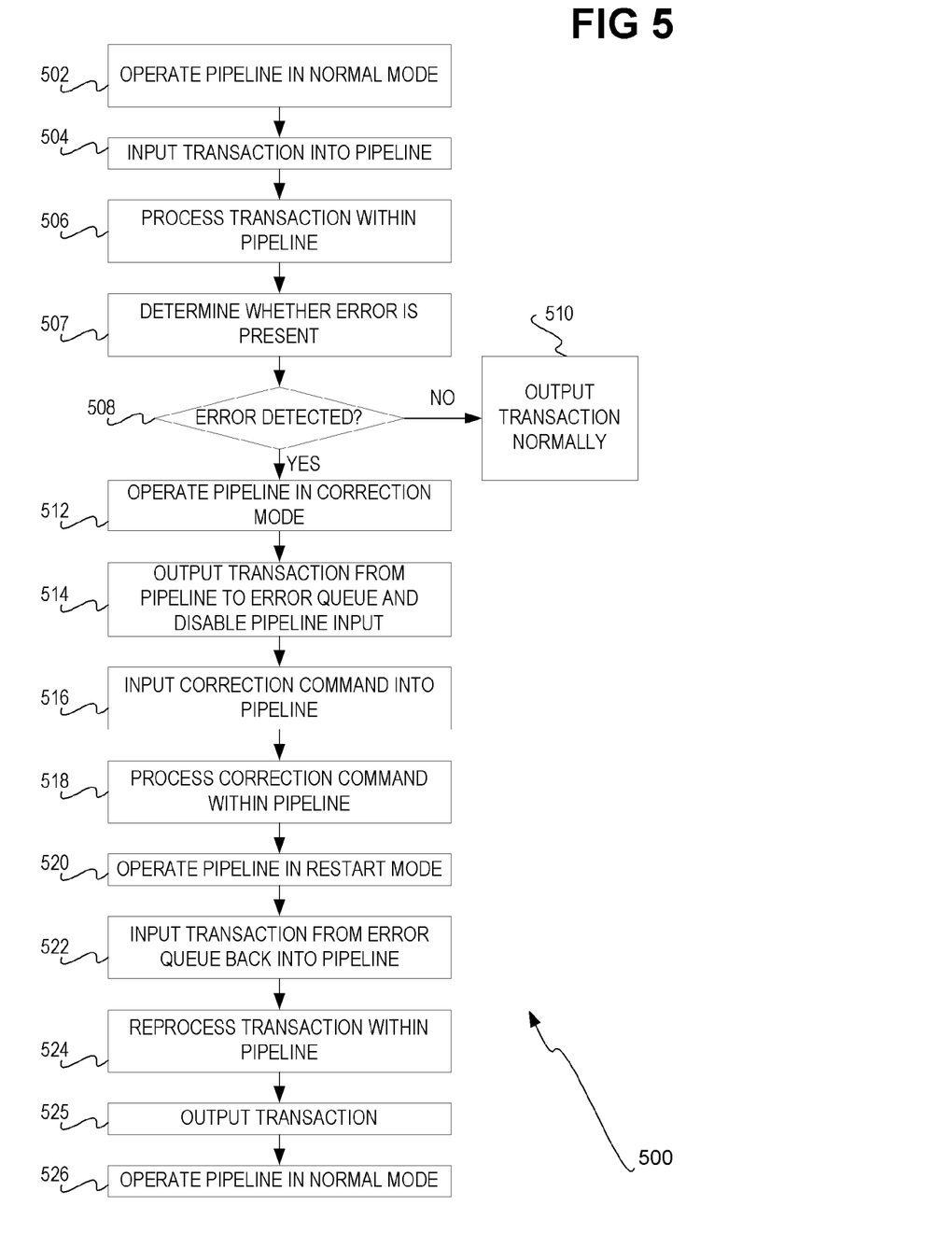
FIG. 5 is a flowchart of a method, according to an embodiment of the invention.

FIG. 5 shows a method 500, according to an embodiment of the invention. The method 500 can be performed by a mode controller of the pipeline. For instance, the mode controller 108 of FIGS. 1 and 4 may perform the method 500 in one embodiment of the invention. The method 500 is for processing a transaction within a pipeline of the controller, and specifically illustrates how error detection and correction occurs within the controller. The method 500 is amenable to a single-stage or a multiple-stage pipeline for transaction processing.

The pipeline is initially operated in a normal mode of operation (502). A transaction is input into the pipeline (504), and processed within the pipeline (506). Preferably within the pipeline, it is determined whether correctable errors are present within the transaction (507). If no errors are detected (508), then the transaction is output from the pipeline normally (510), and the method 500 is finished. However, if an error is detected (508), then the pipeline is operated in a correction mode (512). The transaction is output, or drained, from the pipeline to an error queue and input into the pipeline is disabled (514), instead of being normally output from the pipeline as before.

A correction command is inserted into the pipeline (516) to correct the error that has been detected. The correction command is processed within the pipeline (518) to actually effect correction of the error. The pipeline is then operated in a restart mode of operation (520), and the transaction is input back into the pipeline from the error queue (522). The transaction is reprocessed within the pipeline (524), where the transaction has had its error corrected. The transaction is output from the pipeline (525), and the pipeline is operated in the normal mode of operation as before (526).

Advantages over the Prior Art

Embodiments of the invention allow for advantages over the prior art. The error correction process that has been described does not add latency to the normal processing of transactions within a pipeline. Rather than correcting errors upon finding them, which can also add latency to the processing of transactions without errors, the pipeline instead notifies a mode controller, which drains the pipeline of the transactions, and causes the pipeline to switch to a correction mode to correct the errors, and then to switch to a restart mode to reprocess the transactions. The correction and restart modes, however, are only entered when errors have actually been detected, and therefore do not add latency to the normal processing of transactions without errors.

Alternative Embodiments

It will be appreciated that, although specific embodiments of the invention have been described herein for purposes of illustration, various modifications may be made without departing from the spirit and scope of the invention. For instance, whereas the invention has been described in conjunction with transaction processing that occurs within a pipeline, some embodiments of the invention can apply to transaction processing that occurs without a pipeline. Where a pipeline is used, it may be a single-stage or a multiple-stage pipeline. Furthermore, embodiments of the invention may be implemented in conjunction with pipelines in any logic flow. Accordingly, the scope of protection of this invention is limited only by the following claims and their equivalents.

We claim:

1. A system comprising:
   a plurality of nodes interconnected to one another, each node comprising:
   a plurality of processors;
   local random-access memory (RAM) for the plurality of processors; and,
   at least one controller to process transactions relating to the local RAM of the node, including correcting correctable errors within the transactions in a non-inline manner;
   a single pipeline within which the correctable errors within the transactions are detected; and,
   an error queue in which transactions having the correctable errors are output,
   wherein a transaction is output from the pipeline into the error queue only in response to a correctable error having been detected within the transaction while processing the transaction within the pipeline, the error queue only storing transactions within which correctable errors have been detected and not transactions within which correctable errors have not been detected,
   wherein in a normal mode of each pipeline, the transactions not including the correctable errors are processed in the pipeline for conversion to actions that when performed effect the transactions, and for detecting the correctable errors where the transactions include the correctable errors,
   wherein in an error-correction mode of each pipeline, the transactions including the correctable errors that have been detected are corrected so that the transactions no longer include the correctable errors,
   and wherein in a restart mode of the pipeline, the transactions that included the correctable errors but that no longer include the correctable errors due to correction thereof are converted to the actions that when performed effect the transactions,
   such that, for each pipeline, the transactions including the correctable errors are processed within the pipeline at least three times, including a first time in the normal mode of the pipeline in which the correctable errors are detected, followed by a second time in the error-correction mode of the pipeline in which the correctable errors within the transactions, and followed by a third time in the restart mode of the pipeline in which the transactions are converted to the actions that when performed effect the transactions.

2. The system of claim 1, wherein each controller comprises a mode controller to control a current mode in which the pipeline is operating.

3. The system of claim 1, wherein each controller of each node comprises an application-specific integrated circuit (ASIC).

4. A controller for a node of a system comprising:
   a single pipeline in which transactions are processed;
   a mode controller to control a mode in which the pipeline operates; and,
   an error queue to which those of the transactions including correctable errors are routed for correction of the correctable errors and reprocessing of the transactions,
   wherein a transaction is routed from the pipeline into the error queue only in response to a correctable error having been detected within the transaction while processing the transaction within the pipeline, the error queue only storing transactions within which correctable errors have been detected and not transactions within which correctable errors have not been detected,
   wherein in a normal mode of the pipeline, the transactions not including the correctable errors are processed in the pipeline for conversion to actions that when performed effect the transactions, and for detecting the correctable errors where the transactions include the correctable errors,
   wherein in an error-correction mode of the pipeline, the transactions including the correctable errors that have been detected are corrected so that the transactions no longer include the correctable errors,
   and wherein in a restart mode of the pipeline, the transactions that included the correctable errors but that no longer include the correctable errors due to correction thereof are converted to the actions that when performed effect the transactions,
   such that the transactions including the correctable errors are processed within the pipeline at least three times, including a first time in the normal mode of the pipeline in which the correctable errors are detected, followed by a second time in the error-correction mode of the pipeline in which the correctable errors within the transactions, and followed by a third time in the restart mode of the pipeline in which the transactions are converted to the actions that when performed effect the transactions.

5. The controller of claim 4, wherein the controller is implemented as an application-specific integrated circuit (ASIC).

6. A controller for a node of a system comprising:
   a single pipeline in which transactions are processed;
   a mode controller to control a mode in which the pipeline is operable; and,
   an error queue to which those of the transactions including correctable errors are routed for correction of the correctable errors and reprocessing of the transactions,
   wherein a transaction is routed from the pipeline into the error queue only in response to a correctable error having been detected within the transaction while processing the transaction within the pipeline, the error queue only storing transactions within which correctable errors have been detected and not transactions within which correctable errors have not been detected,
   wherein in a normal mode of the pipeline, the transactions not including the correctable errors are processed in the pipeline for conversion to actions that when performed effect the transactions, and for detecting the correctable errors where the transactions include the correctable errors, wherein in an error-correction mode of the pipeline, the transactions including the correctable errors that have been detected are corrected so that the transactions no longer include the correctable errors, and wherein in a restart mode of the pipeline, the transactions that included the correctable errors but that no longer include the correctable errors due to correction thereof are converted to the actions that when performed effect the transactions, such that the transactions including the correctable errors are processed within the pipeline at least three times, including a first time in the normal mode of the pipeline in which the correctable errors are detected, followed by a second time in the error-correction mode of the pipeline in which the correctable errors within the transactions, and followed by a third time in the restart mode of the pipeline in which the transactions are converted to the actions that when performed effect the transactions.

7. The controller of claim 6, wherein the controller is implemented as an application-specific integrated circuit (ASIC).

8. A system comprising:
a plurality of nodes interconnected to one another, each node comprising:
   a plurality of processors;
   local random-access memory (RAM) for the plurality of processors; and,
   at least one controller to process transactions relating to the local RAM of the node, including correcting correctable errors within the transactions in a non-inline manner;
   a pipeline within which the correctable errors within the transactions are detected;
   an error queue in which transactions having the correctable errors are output,
wherein a transaction is output from the pipeline into the error queue only in response to a correctable error having been detected within the transaction while processing the transaction within the pipeline, the error queue only storing transactions within which correctable errors have been detected and not transactions within which correctable errors have not been detected, wherein in a normal mode of each pipeline, the transactions not including the correctable errors are processed in the pipeline for conversion to actions that when performed effect the transactions, and for detecting the correctable errors where the transactions include the correctable errors, wherein in an error-correction mode of each pipeline, the transactions including the correctable errors that have been detected are corrected so that the transactions no longer include the correctable errors, and wherein in a restart mode of the pipeline, the transactions that included the correctable errors but that no longer include the correctable errors due to correction thereof are converted to the actions that when performed effect the transactions, such that, for each pipeline, the transactions including the correctable errors are processed within the pipeline at least three times, including a first time in the normal mode of the pipeline in which the correctable errors are detected, followed by a second time in the error-correction mode of the pipeline in which the correctable errors within the transactions, and followed by a third time in the restart mode of the pipeline in which the transactions are converted to the actions that when performed effect the transactions.

9. The system of claim 8, wherein each controller comprises a mode controller to control a current mode in which the pipeline is operating.

10. The system of claim 8, wherein each controller of each node comprises an application-specific integrated circuit (ASIC).

* * * * *